US 7,971,150 B2

(12) United States Patent
Raskutti et al.

(10) Patent No.: US 7,971,150 B2
(45) Date of Patent: Jun. 28, 2011

(54) DOCUMENT CATEGORISATION SYSTEM

(75) Inventors: Bhavani Raskutti, Surrey Hills (AU);
Adam Kowalczyk, Glen Waverley (AU)

(73) Assignee: Telstra New Wave Pty Ltd., Melbourn, Victoria (AU)

( * ) Notice: Subject to any disclaimer, the term of this patent is extended or adjusted under 35 U.S.C. 154(b) by 548 days.

(21) Appl. No.: 10/514,470

(22) PCT Filed: Sep. 25, 2001

(86) PCT No.: PCT/AU01/01198
§ 371 (c)(1),
(2), (4) Date: Aug. 24, 2005

(87) PCT Pub. No.: WO02/25479
PCT Pub. Date: Mar. 28, 2002

(65) Prior Publication Data
US 2006/0089924 A1     Apr. 27, 2006

(30) Foreign Application Priority Data
Sep. 25, 2000   (AU) ........................................ PR0338

(51) Int. Cl.
*G06F 3/048* (2006.01)
(52) U.S. Cl. ........ 715/764; 707/736; 707/737; 707/738; 707/739; 707/740
(58) Field of Classification Search .................. 707/1, 7, 707/736–740; 715/764
See application file for complete search history.

(56) References Cited

U.S. PATENT DOCUMENTS

| 5,418,951 | A | * | 5/1995 | Damashek ................... 395/600 |
| 5,448,473 | A | * | 9/1995 | Takeuchi et al. ............... 715/500 |
| 5,548,697 | A |   | 8/1996 | Zortea |
| 5,675,710 | A | * | 10/1997 | Lewis ............................. 706/12 |
| 5,745,893 | A | * | 4/1998 | Hill et al. .......................... 707/5 |
| 5,819,258 | A | * | 10/1998 | Vaithyanathan et al. ......... 707/2 |
| 5,857,179 | A | * | 1/1999 | Vaithyanathan et al. ......... 707/2 |
| 5,864,855 | A | * | 1/1999 | Ruocco et al. .................. 707/10 |

(Continued)

FOREIGN PATENT DOCUMENTS

EP        704810 A      4/1996      ........................ 707/1

(Continued)

OTHER PUBLICATIONS

Salton, "The SMART Retrieval System—Experiments in Automatic Document Processing," Prentice-Hall, New Jersey, (1971).*

(Continued)

*Primary Examiner* — William L Bashore
*Assistant Examiner* — Ashraf Zahr
(74) *Attorney, Agent, or Firm* — Nixon Peabody LLP (57) ABSTRACT

A document categorization system, including a clusterer for generating clusters of related electronic documents based on features extracted from the documents, and a filter module for generating a filter on the basis of the clusters to categorize further documents received by the system. The system may include an editor for manually browsing and modifying the clusters. The categorization of the documents is based on n-grams, which are used to determine significant features of the documents. The system includes a trend analyzer for determining trends of changing document categories over time, and for identifying novel clusters. The system may be implemented as a plug-in module for a spreadsheet application for permitting one-off or ongoing analysis of text entries in a worksheet.

37 Claims, 9 Drawing Sheets

U.S. PATENT DOCUMENTS

| | | | | |
|---|---|---|---|---|
| 5,948,058 | A * | 9/1999 | Kudoh et al. | 709/206 |
| 5,953,718 | A * | 9/1999 | Wical | 707/5 |
| 6,012,058 | A * | 1/2000 | Fayyad et al. | 1/1 |
| 6,032,146 | A * | 2/2000 | Chadha et al. | 1/1 |
| 6,122,628 | A * | 9/2000 | Castelli et al. | 1/1 |
| 6,128,613 | A * | 10/2000 | Wong et al. | 707/7 |
| 6,167,397 | A * | 12/2000 | Jacobson et al. | 707/5 |
| 6,233,575 | B1 * | 5/2001 | Agrawal et al. | 1/1 |
| 6,289,337 | B1 * | 9/2001 | Davies et al. | 707/3 |
| 6,298,351 | B1 * | 10/2001 | Castelli et al. | 707/102 |
| 6,360,215 | B1 * | 3/2002 | Judd et al. | 707/3 |
| 6,424,971 | B1 * | 7/2002 | Kreulen et al. | 707/7 |
| 6,430,547 | B1 * | 8/2002 | Busche et al. | 1/1 |
| 6,442,545 | B1 * | 8/2002 | Feldman et al. | 707/6 |
| 6,446,061 | B1 * | 9/2002 | Doerre et al. | 1/1 |
| 6,502,081 | B1 * | 12/2002 | Wiltshire et al. | 706/12 |
| 6,654,742 | B1 * | 11/2003 | Kobayashi et al. | 707/7 |
| 6,665,681 | B1 * | 12/2003 | Vogel | 1/1 |
| 6,701,314 | B1 * | 3/2004 | Conover et al. | 707/7 |
| 6,766,035 | B1 * | 7/2004 | Gutta | 382/103 |
| 6,922,706 | B1 * | 7/2005 | Kurtzberg et al. | 1/1 |
| 7,003,519 | B1 * | 2/2006 | Biettron et al. | 707/6 |
| 7,194,471 | B1 * | 3/2007 | Nagatsuka et al. | 1/1 |
| 2002/0059161 | A1 * | 5/2002 | Li | 707/1 |
| 2002/0138460 | A1 * | 9/2002 | Cochrane et al. | 707/1 |

FOREIGN PATENT DOCUMENTS

| | | | | |
|---|---|---|---|---|
| EP | 704810 | A1 * | 4/1996 | |
| EP | 1024437 | A | 8/2000 | 707/103 |
| EP | 1024437 | A2 * | 8/2000 | |
| WO | WO97/08604 | | 3/1997 | |
| WO | WO 98/58344 | A1 | 12/1998 | |

OTHER PUBLICATIONS

Rasmussen, E. "Clustering Algorithms," Information Retneva/, W. B. Frake and R. Baeza-Yates ed., Prentice-Hall, New Jersey, (1992).*

Raskutti, B. et al., "An Evaluation of Cdteria for Measuring the Quality of Clusters," Proceedings of the Sixteenth International Joint Conference on Artificial Intelligence, pp. 905-910 (1999).*

Cohen, J. D., "Highlights: Language and Domain Independent Automatic Indexing Terms for Abstracting," Journal of the American Society for/nforrnation Science, 46(3): 162-174 (1995).*

Rasmussen, E. "Clustering Algorithms," *Information Retrieval*, W. B. Frake and R. Baeza-Yates ed., Prentice-Hall, New Jersey, (1992).

Cohen, J. D., "Highlights: Language and Domain Independent Automatic Indexing Terms for Abstracting," *Journal of the American Society for Information Science*, 46(3):162-174 (1995).

Baeza-Yates, R. et al., "Chapter 5: Modern Information Retrieval, Query Operations", *Modern Information Retrieval, Harlow, Addison-Wesley*, GB, (1999) pp. 117-139 Article No. XP002311981.

Baeza-Yates, R. et al., "Chapter 7: Moderen Information Retrieval, Text Operations", *Modern Information Retrieval, Harlow: Addison-Wesley*, GB (Jan. 1, 1999) pp. 163-190 Article No. 002287648.

Griffiths, Alan et al., "Hierarchic Agglomerative Clustering Methods for Automatic Document Classification", *Department of Information Studies, University of Sheffield, Western Bank, Sheffield UK, The Journal of Documentation*, (Sep. 1984) vol. 40, No. 3 pp. 175-205.

Iwayama, Makoto, et al., "Cluster-Based Text Categorization: A Comparison of Category Search Strategies", IN: *Proceedings of the 18th Annual Interntional ACM SIGIR Conference on Research and Development in Information Retrieval, ACM*, Seattle, WA (1995) pp. 273-280.

Joachims, Thorsten, "Text Categorization With Support Vector Machines: Learning With Many Relevant Features", *Machines Learning, European Conference on Machine Learning Proceedings* (Apr. 21, 1998) pp. 137-142 Article No. XP002119808.

Kattenborn, Herbert, "Introducing in Excel 97: Department for Administrative and Clinical data—Hospital of the University of JLU-Giessen", URL: http://www.uniklinikum-giessen.de/res58/excel97skript.pdf German Title—Einfuhrung in Excel97 Abt. fur Klinische and Administrative Datenverarbeitung—Klinikum der JLU-Universitat GieBen printed from Internet on Jan. 14, 2010) pp. 1-150.

Osuna, Edgar, et al., "An Improved Training Algorithm for Support Vector", *Neural Networks for Signal Processing, Proceedings of the IEEE Signal Processing Society Workshop* (1997) pp. 276-285 Article No. XP002119807.

Willett, Peter, "Recent Trends in Hierarchic Document Clustering: A Critical Review", *Department of Information Studies, University of Sheffield, Great Britian, Information Proceeding & Management*, vol. 24, No. 5 (Jan. 1998) pp. 577-597 Article No. XP000573921.

* cited by examiner

| | A | B | C | D | E | F | G | H |
|---|---|---|---|---|---|---|---|---|
| 1 | 1 No Action | 2 Don't Send | 3 More Info | 4 Problems | 5 Call Back | message id | date | text message |
| 2 | 1 | 0 | 0 | 0 | 0 | 1 | 20000817 1101 | |
| 3 | 0 | 0 | 0 | 0 | 0 | 2 | 20000817 1102 | Thanks :-) |
| 4 | 1 | 0 | 0 | 0 | 0 | 3 | 20000817 1103 | |
| 5 | 0 | 0 | 0 | 0 | 0 | 4 | 20000817 1104 | What >o< |
| 6 | 1 | 0 | 0 | 0 | 0 | 5 | 20000817 1104 | |
| 7 | 0 | 0 | 0 | 0 | 0 | 6 | 20000817 1105 | Hi |
| 8 | 0 | 0 | 1 | 0 | 0 | 7 | 20000817 1105 | More information please |
| 9 | 0 | 0 | 0 | 1 | 0 | 8 | 20000817 1106 | WHAT? |
| 10 | 0 | 0 | 0 | 0 | 0 | 9 | 20000817 1107 | Thanks :-) |
| 11 | 0 | 0 | 0 | 1 | 0 | 10 | 20000817 1107 | OK I'LL DO THAT |
| 12 | 1 | 0 | 0 | 0 | 0 | 11 | 20000817 1107 | |
| 13 | 0 | 0 | 0 | 1 | 0 | 12 | 20000817 1108 | Don't understand |
| 14 | 0 | 0 | 1 | 0 | 0 | 13 | 20000817 1108 | What changes? :-) |
| 15 | 0 | 0 | 0 | 0 | 0 | 14 | 20000817 1108 | |
| 16 | 0 | 0 | 0 | 0 | 0 | 15 | 20000817 1108 | Ok. B-) |
| 17 | 1 | 0 | 0 | 0 | 0 | 16 | 20000817 1109 | Thank you |
| 18 | 1 | 0 | 0 | 0 | 0 | 17 | 20000817 1109 | Thank u :-) |
| 19 | 0 | 0 | 0 | 0 | 1 | 18 | 20000817 1110 | Could you ring me again thanks |
| 20 | 1 | 0 | 0 | 0 | 0 | 19 | 20000817 1113 | Whatisitsbot |
| 21 | 0 | 0 | 1 | 0 | 0 | 20 | 20000817 1115 | |
| 22 | 1 | 0 | 0 | 0 | 0 | 21 | 20000817 1119 | |
| 23 | 1 | 0 | 0 | 0 | 0 | 22 | 20000817 1120 | Thankyoubutucantringout |
| 24 | 1 | 0 | 0 | 0 | 0 | 23 | 20000817 1123 | JGJM |
| 25 | 1 | 0 | 0 | 0 | 0 | 24 | 20000817 1129 | |
| 26 | 0 | 0 | 0 | 1 | 0 | 25 | 20000817 1137 | What? |
| 27 | 0 | 0 | 1 | 0 | 0 | 26 | 20000817 1140 | |
| 28 | 1 | 0 | 0 | 0 | 0 | 27 | 20000817 1142 | |
| 29 | 0 | 0 | 0 | 0 | 0 | 28 | | |
| 30 | | | | | | 29 | | |

Figure 7

| | A | B | C | D | E | F | G | H | I | J | K | L | M | N |
|---|---|---|---|---|---|---|---|---|---|---|---|---|---|---|
| 1 | Error | 1 No Action | 2 Don't Send | 3 More Info | 4 Problems | 5 Call Back | score 1 | score 2 | score 3 | score 4 | score 5 | message id | date | text message |
| 2 | | 1 | 0 | 0 | 0 | 0 | 0.94 | 0.99 | 0.98 | 0.96 | 0.99 | 1 | 20000817101 | |
| 3 | | 1 | 0 | 0 | 0 | 0 | 1.17 | 1.09 | 1.20 | 1.19 | 1.10 | 2 | 20000817102 | Thanks :-) |
| 4 | | 1 | 0 | 0 | 0 | 0 | 0.94 | 0.99 | 0.98 | 0.96 | 0.99 | 3 | 20000817103 | |
| 5 | | 0 | 0 | 1 | 0 | 0 | 0.87 | 1.20 | 0.92 | 0.94 | 1.10 | 4 | 20000817104 | What >o< |
| 6 | | 1 | 0 | 0 | 0 | 0 | 0.94 | 0.99 | 0.98 | 0.96 | 0.99 | 5 | 20000817104 | |
| 7 | | 1 | 0 | 0 | 0 | 0 | 0.94 | 0.99 | 0.98 | 0.96 | 1.09 | 6 | 20000817105 | Hi |
| 8 | | 0 | 0 | 1 | 0 | 0 | 1.36 | 1.03 | 1.19 | 1.31 | 0.97 | 7 | 20000817105 | More information |
| 9 | | 1 | 0 | 0 | 1 | 0 | 1.58 | 1.06 | 1.25 | 0.97 | 0.99 | 8 | 20000817106 | WHAT? |
| 10 | | 1 | 0 | 0 | 0 | 0 | 0.94 | 0.99 | 0.98 | 0.96 | 1.09 | 9 | 20000817106 | Thanks :-) |
| 11 | D | 1 | 0 | 0 | 0 | 0 | 0.93 | 0.90 | 0.90 | 0.88 | 1.10 | 10 | 20000817107 | OK I'LL DO THAT |
| 12 | | 1 | 0 | 0 | 0 | 0 | 1.17 | 1.09 | 1.20 | 1.13 | 1.16 | 11 | 20000817107 | |
| 13 | | 1 | 0 | 0 | 0 | 0 | 1.17 | 1.13 | 1.07 | 0.94 | 0.99 | 12 | 20000817108 | Dont understand |
| 14 | | 1 | 0 | 0 | 0 | 0 | 0.94 | 0.99 | 0.98 | 0.96 | 1.00 | 13 | 20000817108 | What changes? |
| 15 | | 0 | 0 | 1 | 0 | 0 | 0.92 | 1.12 | 1.28 | 0.90 | 0.99 | 14 | 20000817108 | |
| 16 | | 1 | 0 | 0 | 0 | 0 | 0.98 | 1.24 | 1.11 | 0.96 | 0.99 | 15 | 20000817108 | |
| 17 | | 1 | 0 | 0 | 0 | 0 | 0.94 | 0.99 | 0.98 | 0.96 | 0.99 | 16 | 20000817108 | |
| 18 | | 1 | 0 | 0 | 0 | 0 | 0.94 | 0.99 | 0.98 | 0.98 | 1.08 | 17 | 20000817108 | Ok. B) |
| 19 | | 1 | 0 | 0 | 0 | 0 | 1.20 | 1.04 | 1.02 | 1.12 | 1.27 | 18 | 20000817109 | Thank you |
| 20 | | 1 | 0 | 0 | 0 | 0 | 1.46 | 0.99 | 1.66 | 1.10 | 1.16 | 19 | 20000817109 | Thank u :-) |
| 21 | | 0 | 0 | 1 | 0 | 0 | 1.14 | 1.00 | 1.16 | 1.21 | 0.78 | 20 | 20000817110 | Could you ring m |
| 22 | | 0 | 0 | 1 | 0 | 0 | 1.48 | 1.00 | 0.81 | 1.83 | 0.99 | 21 | 20000817113 | Whatisitabo! |
| 23 | | 1 | 0 | 0 | 0 | 0 | 0.70 | 1.00 | 0.48 | 0.99 | 0.99 | 22 | 20000817115 | |
| 24 | | 1 | 0 | 0 | 0 | 0 | 0.94 | 0.99 | 0.98 | 0.96 | 1.36 | 23 | 20000817119 | |
| 25 | | 0 | 0 | 1 | 0 | 0 | 1.39 | 1.18 | 1.41 | 0.84 | 1.00 | 24 | 20000817120 | Thankyoubutican |
| 26 | | 1 | 0 | 0 | 0 | 0 | 0.99 | 1.00 | 0.99 | 0.98 | 0.99 | 25 | 20000817123 | JGJM |
| 27 | | 1 | 0 | 0 | 0 | 0 | 0.94 | 0.99 | 0.98 | 0.96 | 1.08 | 26 | 20000817129 | |
| 28 | | 0 | 0 | 1 | 1 | 0 | 0.93 | 1.14 | 0.98 | 0.88 | 1.09 | 27 | 20000817137 | What? |
| 29 | | 1 | 0 | 0 | 0 | 0 | 0.94 | 0.99 | 0.98 | 0.96 | 0.99 | 28 | 20000817140 | |
| 30 | | 1 | 0 | 0 | 0 | 0 | 0.94 | 0.99 | 0.98 | 0.96 | 0.99 | 29 | 20000817142 | |

Figure 8

| | A | B | C | D | E | F | G | H | I | J | K | L | M | N | O |
|---|---|---|---|---|---|---|---|---|---|---|---|---|---|---|---|
| 1 | score 1 | score 2 | score 3 | score 4 | score 5 | Label 1 | Label 2 | Label 3 | Label 4 | Label 5 | message id | date | text message | | |
| 2 | 0.94 | 0.99 | 0.98 | 0.96 | 0.99 | | | | | | 1910 | 20000819 1206 | Whoisit | | |
| 3 | 1.18 | 1.03 | 1.07 | 1.07 | 1.04 | | | | | | 1911 | 20000819 1207 | OK | | |
| 4 | 0.98 | 0.99 | 1.01 | 0.13 | 1.00 | | | | | | 1912 | 20000819 1207 | Huh | | |
| 5 | 1.52 | 1.05 | 1.25 | 1.37 | 1.12 | 1 | | | | | 1913 | 20000819 1207 | Hi from christine | | |
| 6 | 0.99 | 1.12 | 0.78 | 1.11 | 1.07 | 1 | | | | | 1914 | 20000819 1208 | TO BE CONTINUED. | | |
| 7 | 0.93 | 1.14 | 0.90 | 0.88 | 1.09 | | | | | | 1915 | 20000819 1208 | What | | |
| 8 | 1.46 | 0.90 | 1.66 | 1.10 | 1.27 | | | | | | 1916 | 20000819 1208 | Thank you! | | |
| 9 | 1.41 | 1.15 | 0.89 | 1.28 | 1.59 | | | | 1 | | 1917 | 20000819 1208 | Can you send more Intoin th | | |
| 10 | 1.26 | 1.28 | 0.91 | 1.12 | 1.34 | | | | | | 1918 | 20000819 1208 | GO TO WERE GIVE THE A | | |
| 11 | 1.28 | 1.28 | 0.91 | 1.12 | 1.34 | | | | | | 1919 | 20000819 1208 | GO TO WERE GIVE THE A | | |
| 12 | 0.96 | 1.04 | 1.04 | 0.99 | 0.99 | | | | | | 1920 | 20000819 1209 | :-) | | |
| 13 | 0.98 | 0.99 | 0.99 | 0.98 | 1.00 | | | | | | 1921 | 20000819 1210 | J | | |
| 14 | 0.25 | 1.00 | 0.49 | 1.07 | 1.26 | 1 | | | | | 1922 | 20000819 1210 | is that u tahlia | | |
| 15 | 0.94 | 0.99 | 0.98 | 0.96 | 0.99 | | | | | | 1923 | 20000819 1210 | | | |
| 16 | 0.94 | 0.99 | 0.98 | 0.96 | 0.99 | 1 | | | | | 1924 | 20000819 1210 | | | |
| 17 | 1.38 | 0.72 | 0.69 | 0.77 | 1.10 | 1 | | 1 | | | 1925 | 20000819 1211 | What :-/ | | |
| 18 | 0.05 | 0.66 | 0.62 | 1.16 | 0.69 | 1 | | | | | 1926 | 20000819 1211 | U should of told me that 2 d | | |
| 19 | 1.61 | 1.14 | 1.33 | 1.11 | 1.19 | 1 | | | | | 1927 | 20000819 1212 | Freecall "125888" from you | | |
| 20 | 2.23 | 1.01 | 1.16 | 2.65 | 1.91 | 1 | | | | | 1928 | 20000819 1212 | How much dosme message | | |
| 21 | 0.78 | 1.00 | 0.75 | 1.12 | 1.31 | 1 | | | | | 1929 | 20000819 1212 | Suck me beautiful (0) | | |
| 22 | 0.16 | 0.33 | 0.81 | 1.19 | 0.65 | 1 | | 1 | | | 1930 | 20000819 1212 | No | | |
| 23 | 0.94 | 1.02 | 1.05 | 0.88 | 1.07 | | | | | | 1931 | 20000819 1212 | | | |
| 24 | 0.94 | 0.99 | 0.98 | 0.96 | 0.99 | 1 | | | | | 1932 | 20000819 1212 | | | |
| 25 | 1.89 | 0.89 | 1.12 | 1.32 | 0.74 | 1 | | | 1 | | 1933 | 20000819 1213 | Can you give me more infor | | |
| 26 | 1.20 | 0.90 | 1.28 | 1.25 | 1.10 | 1 | | | | | 1934 | 20000819 1213 | Hi im mike sounds good :-) | | |
| 27 | 0.94 | 0.99 | 0.98 | 0.96 | 0.99 | | | | | | 1935 | 20000819 1213 | | | |
| 28 | 0.94 | 0.99 | 0.98 | 0.96 | 0.99 | | | | | | 1936 | 20000819 1213 | | | |
| 29 | 1.08 | 1.06 | 1.09 | 1.04 | 1.03 | 1 | | | | | 1937 | 20000819 1216 | Thanx :-) | | |
| 30 | 0.72 | 0.70 | 0.99 | 0.97 | 1.01 | | | | | | 1938 | 20000819 1216 | y | | |
| 31 | 1.25 | 1.59 | 2.90 | 1.84 | 1.48 | 1 | | | 1 | | 1939 | 20000819 1217 | Thanks for you msg I dont u | | |

Figure 9

DOCUMENT CATEGORISATION SYSTEM

FIELD OF THE INVENTION

The present invention relates to information systems, and in particular to a method and system for categorising electronic documents and for characterising the resulting categories.

BACKGROUND OF THE INVENTION

The information age brings with it the risk of information overload. In particular, large service organisations typically interact with an enormous number of customers, and the introduction of electronic message handling systems into such organisations necessitates some method of efficiently dealing with large numbers of electronic messages or other forms of electronic documents. It is desired, therefore, to provide a system and method for categorising electronic documents and for characterising the resulting categories, or at least provide a useful alternative to existing systems.

SUMMARY OF THE INVENTION

In accordance with the present invention there is provided a document categorisation system including:
  a clusterer for generating clusters of related electronic documents based on features extracted from said documents; and
  a filter module for generating a filter on the basis of said clusters to categorise further documents received by said system.

The present invention also provides a document categorisation system including:
  a clusterer for generating clusters of related electronic documents based on features extracted from said documents; and
  an editor for browsing and modifying said clusters.

Preferably, said clusterer is adapted to extract features from electronic documents, determine significant features from said extracted features, and generate clusters of said documents based on said significant features.

Preferably said features include at least one of n-grams, words and phrases. Preferably the clusterer further includes a cluster describer module for generating text describing each cluster.

The present invention also provides a document categorisation system including:
  an editor for browsing and modifying clustered documents; and
  a filter module for generating a filter on the basis of features of said clusters to categorise further documents received by said system.

The present invention also provides a document categorisation system including:
  a clusterer for generating clusters of documents by executing unsupervised learning on said documents; and
  a filter module for generating a filter to categorise received documents by executing supervised learning on said clusters.

Advantageously the system may further include an editor to adjust said clusters.

Advantageously the system may further include a trend analyzer for determining trends of document categories over time.

The present invention also provides a method for categorising documents, including creating categories for said documents based on feature extraction, where said features include at least one of n-grams, words and phrases.

The present invention also provides a method for categorising documents, including:
  creating categories for said documents, based on feature extraction; and
  manually modifying said categories with a category editor.

Preferably, said method includes selecting features of said documents based on a respective discriminating ability of each feature.

Preferably, said discriminating ability is based on similarities for said documents with and without said feature.

The present invention also provides a method for categorising a document, including:
  creating a document filter for a preexisting document category by analysing pre-existing documents in said category; and
  applying said filter to said document in order to determine whether said document belongs in said category.

Preferably, said category is determined by features which are generated by an n-gram extraction process.

Advantageously, said filter may also be used to produce descriptive labels for large document sets.

Advantageously, said descriptive labels may include at least one of phrases and sentences.

Advantageously, said categories may be described by an n-gram extraction process.

Preferably, said method includes determining a trend of a document category over time.

The present invention also provides a data categorisation module for use with a spreadsheet application, said module including:
  a cluster module for generating clusters of related data from data in a document of the spreadsheet application, based on extracted features of said data; and
  a training module for generating a filter on the basis of said clusters to categorise further data Preferably, said data categorisation module includes a filtering module for categorising said further data on the basis of said filter.

Preferably, said data includes a plurality of entries within a worksheet of said application.

Advantageously, said entries may include text data to be used for categorising said plurality of entries, and structured data.

Preferably, said cluster module is adapted to generate a cluster identifier for identifying a cluster to which an entry of said data belongs, and a cluster size value for identifying the size of said cluster.

Preferably, said cluster module is adapted to generate at least one category descriptor for said entry.

Preferably, said cluster module is adapted to generate a worksheet column for identifying a category of each entry of said data.

Preferably, said cluster module is adapted to generate a formatted version of text data of an entry for indicating a category descriptor of said entry.

Preferably, said data categorisation module includes a module for testing said filters by categorising training data on the basis of filters generated using said training data.

Preferably, said data categorisation module includes labelling functions for generating a category identifier for an entry of said data. Preferably, said labelling functions include a labelling function for generating a plurality of category columns of said worksheet for identifying at least one category of an entry.

Preferably, said filtering module generates a respective score for each category of an entry. Preferably, said filtering module generates an error for an entry if any one of said scores is inconsistent with a respective category identifier. Preferably, a score indicates that the corresponding entry belongs to a respective category if said score exceeds a predetermined value. Preferably, the default value of said predetermined value is zero.

Preferably, scores exceeding said predetermined value are formatted differently than scores less than said predetermined value. Preferably, the score may be used to calculate the probability that said entry belongs to the corresponding category.

The present invention also provides a data categorisation module for use with a spreadsheet application, said module including a cluster module for generating clusters of related data from data in a document of the spreadsheet application, based on extracted features of said data.

The present invention also provides a method of data categorisation in, a spreadsheet application, including the steps of:
 a cluster module for generating clusters of related data from data in a document of the spreadsheet application, based on extracted features of said data; and
 a training module for generating a filter on the basis of said clusters to categorise further data.

BRIEF DESCRIPTION OF THE DRAWINGS

Preferred embodiments of the present invention are hereinafter described, by way of example only, with reference to the accompanying drawings, wherein:

FIGS. 5 to 9 are screenshots of a spreadsheet application with the plug-in module.

DETAILED DESCRIPTION OF THE INVENTION

Figure 1:
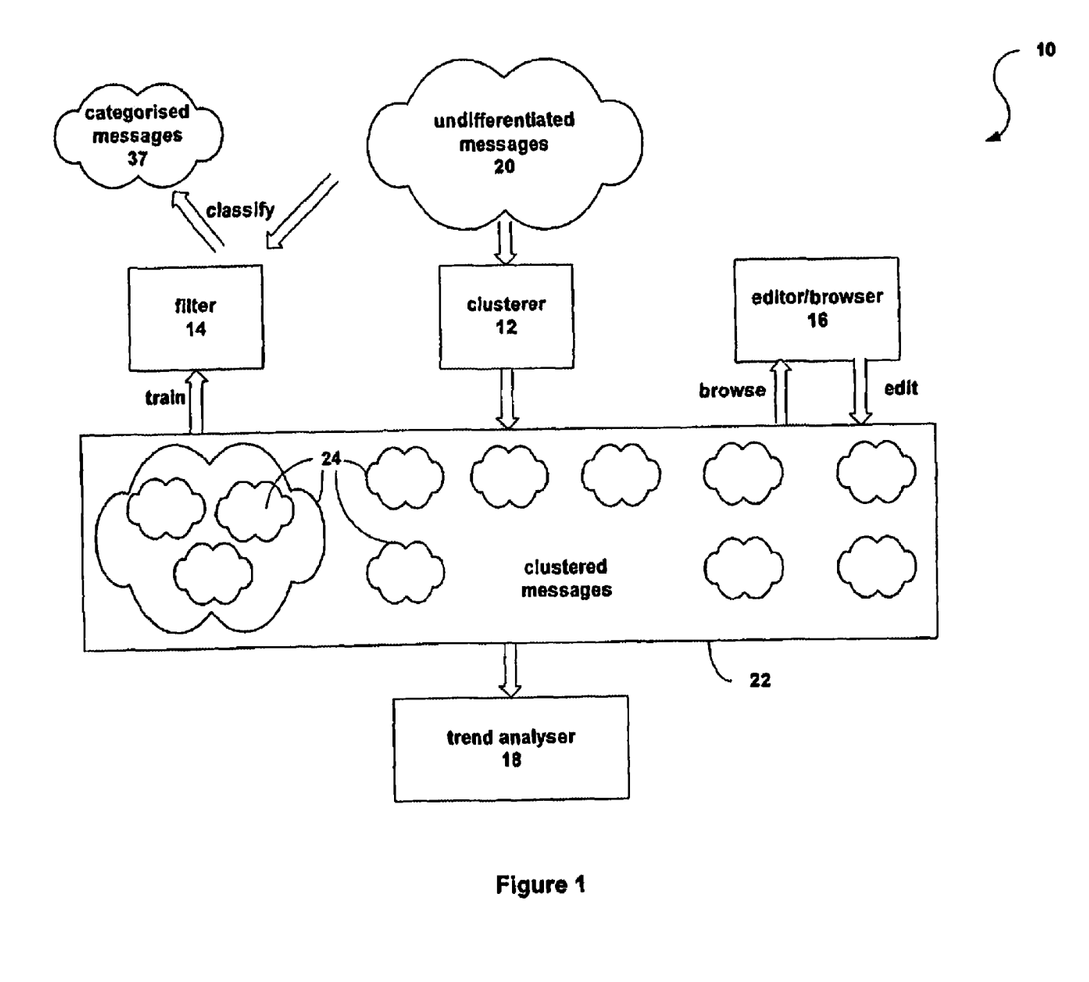
FIG. 1 is a block diagram of a preferred embodiment of a document categorisation system.

A document categorisation system 10 includes a clusterer module 12, a filter module 14, an editor/browser module 16 and a trend analyser module 18. The clusterer 12 processes electronic messages or other documents 20 and groups them into a set 22 of clusters 24 of related documents and then creates a description in the form of a set of keywords and key phrases for each cluster 24. The editor/browser 16 provides an interactive user interface that allows a data analyst to browse through the clustered documents 22 and to modify the clusters 24 if desired so that each cluster contains a coherent set of documents. The filter module 14 analyses existing clusters in order to categorise new documents. The Trend Analyser 18 analyses clusters over various time periods and compares different categorisations of the same documents to determine a coherent and useful classification for these documents and determines novel clusters.

Together, the modules 12 to 18 constitute a document categorisation system 10 which can, for example, automatically categorise large numbers (typically 10,000-25,000) of electronic text messages, such as complaints and survey text, into a much smaller number (approximately 250-500 in this example) of groups or clusters. These messages are typically written under time constraints and they are therefore terse and contain abbreviations as well as typing and spelling errors. The system 10 can also track specific message categories, route messages (e.g., emails), and alert users when there are novel (i.e., unusual) messages.

Figure 2:
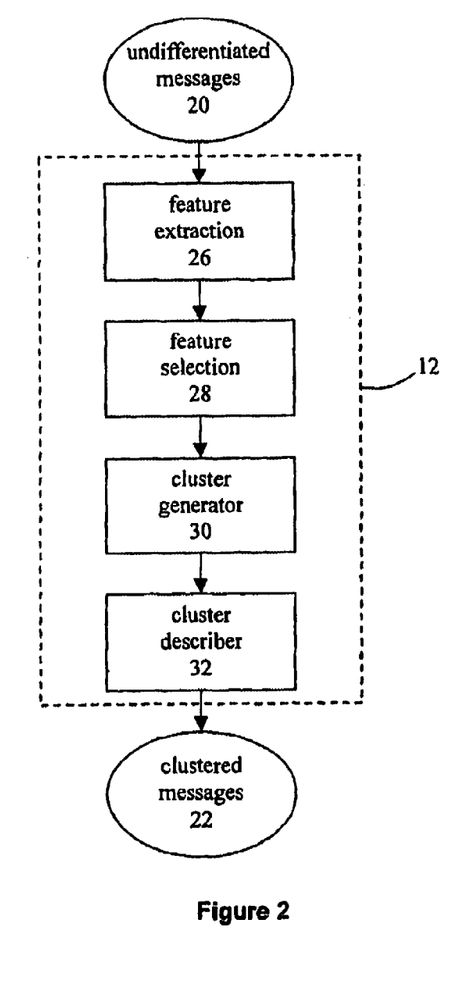
FIG. 2 is a block diagram of a clusterer of the system.

The clusterer 12 groups together related documents. For navigation and editing purposes, each group is labelled using a cluster description technique, as described below. The grouping and labelling allows a large document repository to be navigated and modified easily. The clustering implementation is based on a document clustering methodology described in Salton, The SMART Retrieval System—Experiments in Automatic Document Processing, Prentice-Hall, New Jersey, 1971 ("Salton"). As shown in FIG. 2, the clusterer 12 includes a feature extraction module 26, a feature selection module 28, a cluster generator 30, and a cluster describer module 32. The feature extraction module 26 processes each document to produce a vector of token frequencies, where tokens may be n-grams, words or phrases, and where some tokens may be excluded using feature selection criteria of the feature selection module 28. A similarity measure is then defined as a function of these document vectors to quantify the similarity between any two documents. Finally, the clustering generator 20 uses this similarity measure to group similar documents into clusters.

The feature extraction module 26 extracts n-grams, words, and/or phrases as tokens to represent a document or message. N-grams are especially suited for processing of noisy and/or un-grammatical text, such as SMS messages. The n-grams are sequences of characters of length n, and they are extracted as follows. First, each document is represented as a sequence of characters or a vector of characters (referred to as document-sequence vector). Next, each document-sequence vector is processed to extract n-grams and their frequencies (number of occurrences) for that document. For example, the sequence of characters "to build" will give rise to the following 5-grams "to bu", "bui", "buil", "build". Words and phrases extracted may be stemmed, although that is not necessary. Because the clustering process uses n-gram vectors rather than word vectors only, it is tolerant of spelling and typing errors, because a single error in the spelling of a long word nevertheless yields n-grams that are the same as those from the correctly spelled word.

The feature selection module 28 of the clusterer 12 is executed before clustering to include in the document vectors only those features that provide significant information for clustering. This not only reduces time for clustering by reducing the feature space, but also increases the accuracy of clustering, because noisy features are eliminated. The feature selection process determines the discriminating ability of a feature. The ability of a feature to discriminate depends on how many documents a feature appears in (referred to as DF), and the frequency of that feature in each document (referred to as TF). Those features that appear frequently within few documents are more discriminating than those that appear infrequently in most of the documents. Traditionally, in information retrieval, this reasoning is captured using the TFs and DF of each feature to arrive at an importance value.

In the document categorisation system 10, the computed discrimination ability is based on the premise that if a very good discriminating feature is removed from the feature space, then the average similarity between documents in the repository increases significantly. Thus, by computing average similarity between documents with and without a feature, it is possible to determine the feature's discriminating ability. The similarity of a particular document is computed with a cosine coefficient, as is described in Salton. The average similarity of a document set is determined by summing the similarities between each document and the centroid (where the centroid is the average of feature frequency vectors of all the documents in the set). This method for feature selection has been traditionally ignored due to its computational cost, since it involves nm similarity computations, where n is the number of documents and m is the total number of words or features. As the following equation shows, each cosine similarity computation itself has a computational complexity of $m^2$:

$$s_{ij} = \frac{\sum_{k=1}^{m} f_{ik} f_{jk}}{\sqrt{\sum_{k=1}^{m} f_{ik}^2} \sqrt{\sum_{k=1}^{m} f_{jk}^2}}$$

where $s_{ij}$ is the similarity measure, $i, j=1, \ldots, n$ represents the document number in the document set, and f represents the frequency of occurrence of a feature denoted by the integer k.

However, by storing the norm of frequency vectors and their dot products with the centroid, i.e., $$\sqrt{\sum_{k=1}^{m} f_{ik}^2} \text{ and } \sum_{k=1}^{m} f_{ik} f_{jk},$$

respectively, with j being the centroid document, the feature selector is able to compute scores for each feature in linear time. This score determines discrimination ability features for clustering better than the standard inverse document frequency-term frequency (IDF-TF) scores described in Salton.

After the features have been extracted and selected, the clusters are defined by the cluster generator 30. The cluster generator 30 uses a clustering algorithm that is an enhancement of a single-pass, non-hierarchical method which partitions the repository into disjoint sets, as described in E. Rasmussen, "Clustering Algorithms", Information Retrieval, W. B. Frake and R. Baeza-Yates ed., Prentice-Hall, New Jersey, 1992. The algorithm proceeds as follows: the first document D1 is used to create the first cluster C1. Each remaining document, Dk, is assigned to the nearest cluster Cj, or a new cluster if none is sufficiently close. ID order to compare documents to clusters, each cluster is represented by its centroid, which is the average of word frequency vectors of all the documents in the cluster. A new cluster is started when none of the existing clusters are sufficiently close, based on a specified similarity or distance threshold T.

As mentioned above, the clustering algorithm creates no hierarchies. However, hierarchies can be implemented by clustering at the first level, and then clustering the clusters using cluster centroids. Since the algorithm itself is not hierarchical, the complexity is O(nm), where n is the number of entities to cluster at each level and m is the number of clusters.

In order to determine if documents are sufficiently close, traditional single-pass algorithms require the threshold T, the separation between groups, to be specified prior to clustering. This may result in sub-optimal clustering, because the groupings are primarily dependent on the contents of the repository. In contrast, the algorithm used by the clusterer 12 determines the number of clusters by creating different groupings of the data set at different separation thresholds and then evaluating these groupings to determine the best grouping. The evaluation takes into account the affinity within groups as well as separation from other groups, as described in B. Raskutti and C. Leckie, "An Evaluation of Criteria for Measuring the Quality of Clusters", pp. 905-910, Proceedings of the Sixteenth International Joint Conference on Artificial Intelligence, 1999. Thus, the clustering algorithm imposes a structure (a hierarchy) on previously unstructured documents. Since the clustering is based on the tokens (i.e., n-grams, words and/or phrases) in a message, as well as tokens in other messages, it typically captures the conceptual relations.

The clusterer 12 also labels groups based on their contents using the cluster describer module 32. It extracts words, phrases and/or sentences from a document that are most descriptive of that document, in contrast to standard approaches which extract words only. The method is similar to that described in J. D. Cohen, "Highlights: Language and Domain Independent Automatic Indexing terms for Abstracting", Journal of the American Society for Information Science, 46(3): 162: 174, 1995 for generating highlights or abstracts for documents that are retrieved by an information retrieval system.

In order to determine the words and phrase that describe a group of documents, the following steps are performed by the cluster describer module 32. First, all documents within a group are combined into one hyper-document. In all further analysis, the hyper-documents are treated as a single document, and it is these hyper-documents that are to be described or labelled. Second, the distribution of the n-grams over the document space is computed by counting the occurrence of n-grams in the documents. Next, each n-gram is assigned a score per document that indicates how novel or unique it is for the document. This novelty score is based on the probability of the occurrence of the n-gram in the document and the probability of occurrence elsewhere (i.e., in another cluster). Next, the novelty score of each n-gram is apportioned across the characters in the n-gram. For example, the apportioning could be so that the entire score is allocated to the middle character, and the other characters are assigned a score of zero. This apportioning allows each character in the sequence (hence each entry in the document-sequence vector) to be assigned a weight. Finally, these weights are used to compute a score for each word or phrase based on their component characters and their scores. These scores may be used as is or combined, if necessary, with language-dependent analysis, such as stemming, to filter out non-essential features.

Thus, for each document (i.e., the hyper-document for each group of documents), the output of the cluster describer 32 is a set of descriptors (words or phrases) in the document with associated scores indicating how well they describe the document In the case of a hyper-document, these scores measure how close the descriptors are to the topic of the cluster, and are used to create a succinct description of a cluster. This also means that a descriptor may have different scores for different clusters. For instance, the word "vector" may have a higher score in a cluster about vector analysis and a lower score in a cluster about vector analysis for search engines. This score is then used to rank different descriptors for a cluster such that the most descriptive term is listed first.

Because the system 10 is based on n-grams, there is no necessity for language-dependent pre-processing such as stemming and removal of function words. Hence, the extraction process is language-independent and is tolerant of spelling and typing errors. Furthermore, this technique can be used to extract words or phrases or sentences or even paragraphs (for large documents), since the fundamental units for determining novelty are not words but character sequences. Moreover, these character sequences need not even be text. Hence, with minor modifications, the same technique may be used to pick out novel regions within an image or audio track.

The clusterer 12 described above imposes a structure on a previously unstructured collection of documents. This structure, typically, captures the appropriate conceptual relations; however, as with all categorizations, whether manual or automatic, the clusters may require slier refinement. The editor/browser 16 provides the ability to manually alter the automatically created groups for greater coherence and usability. It provides a visual user interface to allow browsing of the cluster hierarchy and a number of editing functions. These editing functions include file manager like functions, such as the ability to create and delete clusters, edit cluster descriptions, and move messages/clusters to other clusters. However, it also allows the user to (i) highlight words and/or phrases in documents to indicate the cluster topic, (ii) create sub-clusters within very large and diverse clusters (using the clusterer 12), and (iii) create a filter for a cluster/category, using the messages under that cluster as examples (by using filter module 14).

Figure 3:
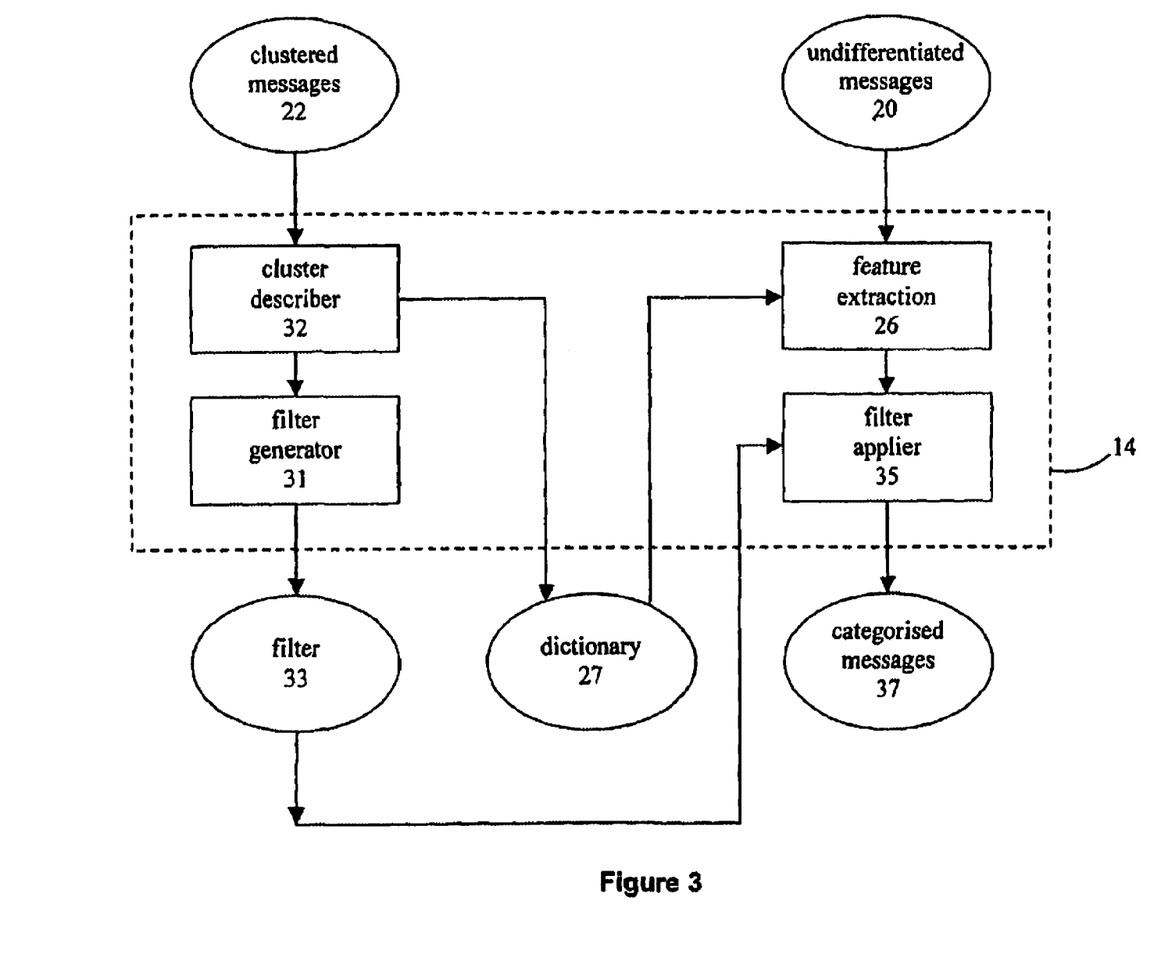
FIG. 3 is a block diagram of a filter module of the system.

As shown in FIG. 3, the filter module 14 includes the cluster describer 32 described above, a filter generator 31, a feature extractor 26, and a filter applier 35. The filter module 14 has two modes: a training mode and a classification mode. In the training mode, the filter module 14 learns the features of messages belonging to a particular category based on examples of earlier documents. These example documents for the categories may have been grouped by the clusterer 12 and/or the browser/editor 16, or created by some other means. The filter module 14 generates a filter 33 based on the characteristics of messages in the categories. The resulting filter 33 is subsequently used by the filter module 14 in its classification (categorisation) mode, whereby each new message is tagged with scores indicating the likelihood that it belongs to a particular category. For particular applications, such as complaint analysis, if a new message does not fit in with any of the previously defined categories, it can be defined as a novel message, and a data analyst is alerted by e-mail or otherwise.

The filter training process begins with a feature extraction process, executed by the feature extractor 26 cluster describer 32, that extracts terms (words, phrases and/or n-grams) that are useful to distinguish one category from another. This advantageously uses the cluster describer for extracting words and phrases, however, if desired, other feature extraction processes may be used. The words, phrases and n-grams so selected are called terms, and these terms are stored in a dictionary 27. Each example in the training set is then represented by a term vector, describing frequencies of appearance of terms from dictionary 27 in the example. The filter generator 31 then uses these term vectors to learn models for discriminating each category from the others. The filter generator 31 then generates a filter 33 containing data representing the resulting models. This requires special machine learning technique capable of dealing with sparse high-dimensional data spaces. The particular learning technique that is used is that for Support Vector Machines (SVM). The technique is described in the specification of Australian Patent Application PQ6844/00, which is incorporated herein by reference. SVM is a relatively novel approach to supervised learning used for both classification and regression problems. The word supervised refers to the fact that the data is labelled. The aim of training in such a case is to look for patterns in the data that conform to this labelling, and to build a model correlated with the labels and capable of predicting labels for new examples with high accuracy. This is different from the unsupervised learning or clustering used in the clusterer 12, whereby a natural or inherent groupings are developed, based on patterns in the data.

SVM techniques are particularly useful for text categorisation due to the fact that text categorisation involves large sparse feature spaces, and SVMs have the potential to handle such feature spaces. The training algorithm is used by the filter module 14 both to learn from very few examples as well as to learn long-term filters using large numbers of examples.

The filter 33 contains information that is used by the filter applier 35 to determine a numerical score for a new message which has been converted to a term vector. The term vector provides occurrence frequencies for terms in the dictionary 27 that appear in the message. In the simplest case of an SVM with linear kernel, the filter 33 for a category is simply a vector of weights, one for each entry in the dictionary 27. The filter applier then determines a dot product between the term vector of the message and the weight vector for the category to obtain a numerical score:

$$score_{ij} = \sum_{k=1}^{m} w_{ik} f_{jk},$$

where $w_{ik}$, k=1, . . . , m is a weight vector for the category i and $f_{jk}$, k=1, . . . , m, is the term vector for message j.

The Trend Analyser 18 performs two primary functions. The first is to track specific categories of messages over different time periods. This may be as simple as a comparison of the number of messages in a chosen category at different time periods. However, the analyser also performs a thorough analysis of category variation at different periods, such as movement of the centroid (average of word frequency vector for the messages in that category), categorisation confidence, and other indications of category change. Thus, this functionality is focussed on understanding a single document category over time. If there are very few messages for a particular category in consecutive time periods, this might indicate that the corresponding filter is no longer required. Conversely, if the number of messages within a group is getting larger and unmanageable, it may be necessary to use the clusterer 12 to create finer partitioning of this category.

The second function of the trend analyser 18 is to compare different categorisations of the same documents in order to determine a coherent and useful classification for these documents. When using the filter module 14 to create categorisations for ongoing analysis, it may be necessary to check that the nature of the actual documents has not deviated too far from the filters that were created, and that the filters are up-to-date. This requires a user to compare the categorisations produced by the clusterer 12 with those produced by the filter module 14, and to highlight the differences so that filter definitions may be modified accordingly. Thus, this functionality is focussed on analysing the whole message space and what categories need to be defined to understand that space.

The document categorsation system 10 may be used in several modes. Several examples of applications are:
(i) One-off analysis, e.g., to understand information from customer surveys. This mode requires only the clusterer 12 and editor/browser 16 in order to understand broad tendencies expressed in surveys.
(ii) On-going analysis of unstructured information, e.g., to understand and monitor customer complaints. In this mode, firstly messages are clustered and hierarchies edited during the initial period in order to identify coherent categories, and then filters are created for these categories in order to classify new data. Novel messages may then need to be clustered in new categories. Thus, this mode requires all four modules 12 to 18 of the system 10.

(iii) Relevance feedback mode for on-going analysis of information that is well understood, but not necessarily categorised. In this mode, data analysts may know roughly what categories they need, although they may not have a large set of examples to define these categories. In this mode, the following steps are executed:
  (a) create a filter for a specific category by learning from very few examples;
  (b) use the filter to sort all messages so that those in the category appear at the top;
  (c) use the sorted list to manually increase the number examples for that category; and
  (d) iterate through steps (a) to (c) until a satisfactory filter is created.

This mode uses manual feedback information regarding the accuracy of the filter to modify the filter very quickly. This can be used as a tool to quickly create a training set from a large uncategorised set of messages.

This feedback loop may be incorporated into a number of different applications. In a search engine, this loop may be used to refine results based on relevance feedback. In a spam filter, it may be used for quickly creating examples of spam and non-spam email messages. This mode requires the filter module 14 and the editor/browser 16 to be suitably tailored.

The relevance feedback mode can be used for once-off analysis as described in (i) on its own, or in conjunction with clustering.

(iv) Adaptive learning of multiple filters, e.g., routing of customer communications where different filters not only provide rejections, but also suggestions as to which other filter should have been the recipient of a particular message. This mode is similar to the previous mode except that multiple filters are adjusted simultaneously, in response to feedback from multiple human operators.

(v) Thesaurus creation mode, for understanding how different words/acronyms used in the messages relate to each other. The words are clustered based on which documents they appear in, and this organisation may be browsed and edited to understand the relationship between words.

Service providers such as telecommunication companies, banks and insurance companies often need to process large numbers of short text messages, such as complaints, exit interviews, survey information, and so on. As described above, these messages are typically written down under time constraints, and consequently they may be short and contain abbreviations and typing/spelling errors. Despite this, such messages generally capture the writer's intent/meaning very clearly. Once captured, these text messages are usually associated with structured information such as the category of customer, location of service, etc. The structured information is typically analysed using a spreadsheet application, while the text messages themselves are ignored or interpreted manually, by a customer service representative, for example.

In an alternative embodiment of the present invention, the clustering and the filtering methods of the categorisation system are embodied in components of a plug-in module 34 for a spreadsheet application 36 such as Microsoft Excel®, as shown in FIG. 3. The plug-in module 34 includes a ClusterData module 38, a TrainFilters module 40, a TestFilters module 42, a FilterData module 44, support function modules 46, and interface data 48. The combination of the spreadsheet application 36 and the plug-in module 34 provides a convenient system for categorising short text messages, and allows the spreadsheet application 36 to be used to analyse databases that include both structured information and free-text messages, such as a customer complaints database. In particular, the plug-in 34 provides the ability to:
  (i) automatically group related messages into clusters that have natural affinity, and describe these clusters for easy browsing;
  (ii) manually browse and alter the groupings to suit business needs;
  (iii) learn models for these groups and save them so that new messages can be classified using these models; and
  (iv) classify new messages using earlier models.

As shown in FIG. 3, the plug-in interface data 48 provides a number of additional buttons 50 to 76 to the spreadsheet application toolbar area 52, allowing a user of the application to analyse free-text data. The buttons include presentation buttons 50 to 60, label buttons 62 to 68, and module invocation buttons 70 to 76. The module invocation buttons 70 to 76 will be described first. A ClusterData button 76 invokes the ClusterData module 38 of the plug-in 34, allowing the user to cluster data selected in a worksheet 78 into groups or categories in order to provide one-off analysis, e.g., to understand information from customer surveys. Each row of the worksheet 78 is considered to be a separate entry or record to be clustered. Each entry may be associated with one or more category labels which are integers that identify the categories to which the entry belongs, as described below.

A TrainFilters button 70 invokes the TrainFilters module 40 for learning a model of the various groups or categories on the basis of selected data in the worksheet 78. The selected data includes the textual data for each entry, and category labels used to identify the categories to which each entry belongs. Such models may be used for on-going analysis of unstructured information, e.g., to understand and monitor customer complaints.

A TestFilters button 72 invokes the TestFilters module 42 that tests the models created by the TrainFilters module 40 on data whose labels are known. For example, a simple sanity check for a new model is to select the data that was used for training in order to confirm that the model can at least classify the training data correctly.

A RunFilters button 74 invokes the FilterData module 44 that uses the models created by TrainFilters module 40 on new (i.e., uncategorised) data. In this case, the labels of input entries are unknown, and the models are used to predict labels.

The remaining buttons 50 to 68 invoke support function modules 46 that allow easy visualisation and manipulation of groups and individual entries in order to facilitate the structuring of textual data within the spreadsheet application 36. These support functions 46, along with the analysis buttons 70 to 76, may be used to perform one-off analysis of textual data, e.g., to understand information from customer surveys, and/or on-going analysis of unstructured information, e.g., to understand and monitor customer complaints. In the latter mode, it is first necessary to cluster and edit groups in order to identify coherent categories, and then create filters for these categories for classifying new data. Novel messages may then need to be clustered and new categories created if there are sufficient numbers of novel messages of any one category.

Figure 4:
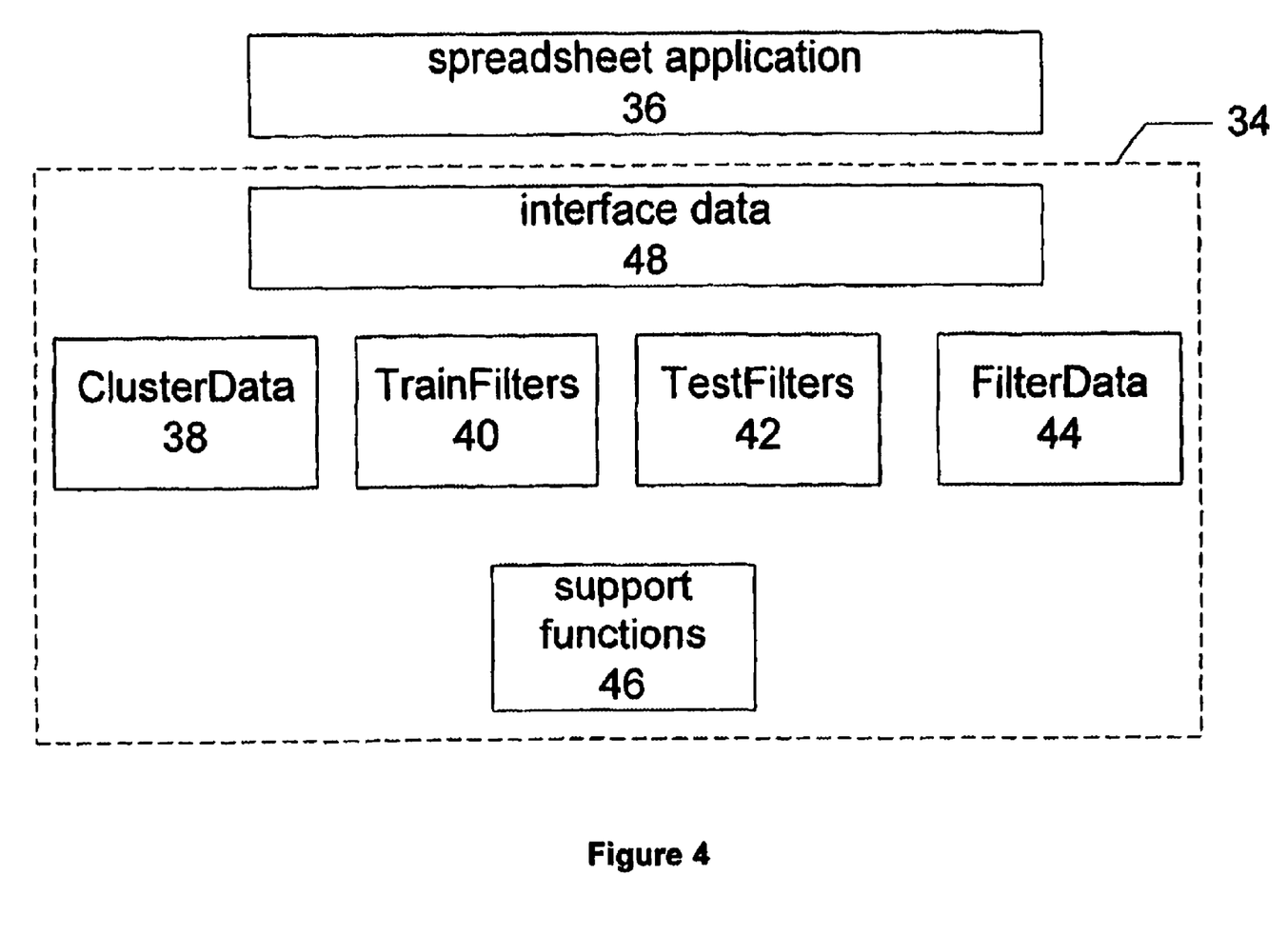
FIG. 4 is a block diagram showing components of a preferred embodiment of a plug-in data categorisaton module for a spreadsheet application.
Figure 5:
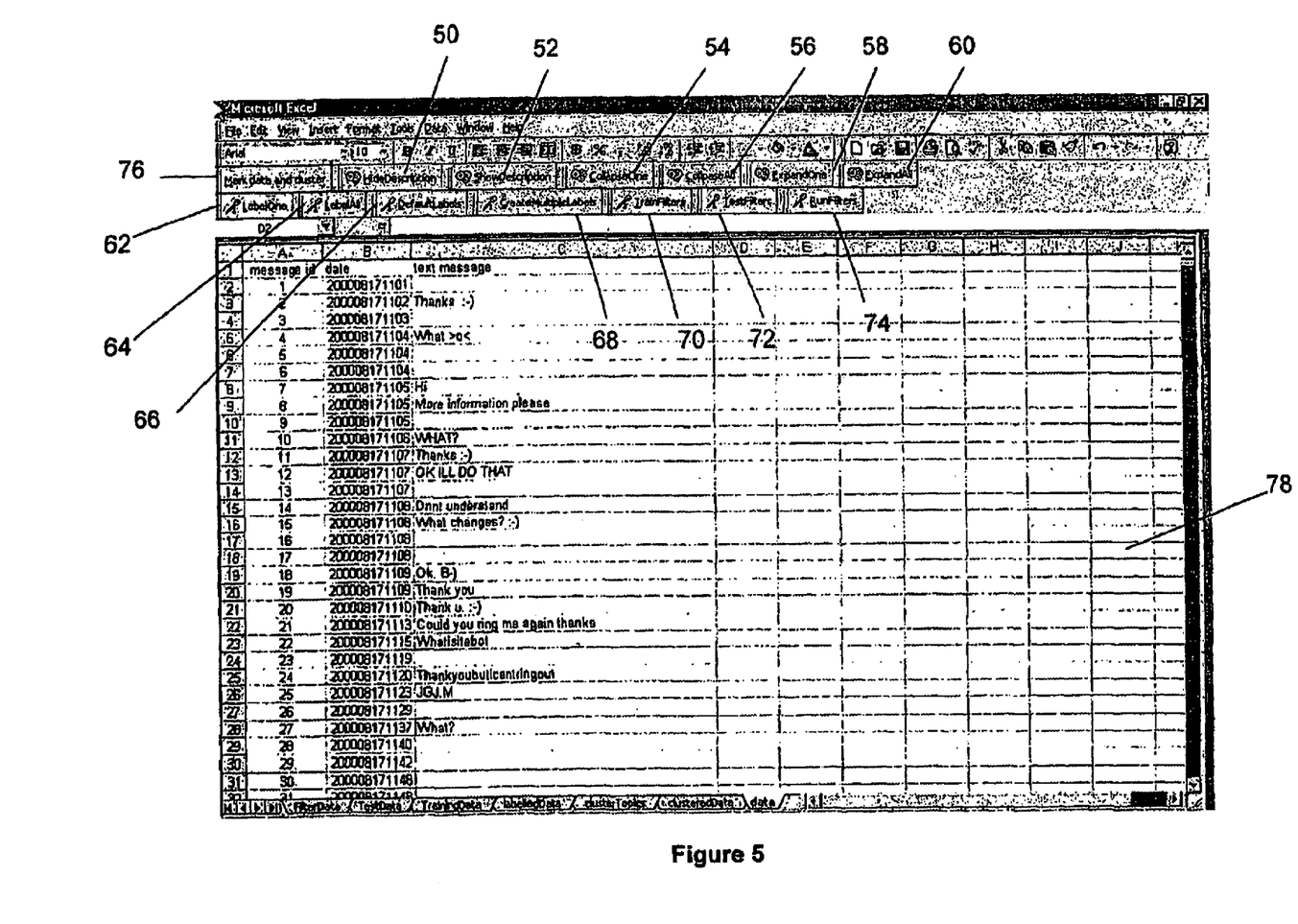

For example, column C of the worksheet area 78 of FIG. 4 includes customer text sent to a service provider from mobile telephones using short message services (SMS). The text entries contain typing errors and non-alphanumeric characters. In this example, columns A and B contain structured data which is ignored: Column A provides a list of unique message identifiers, and column B provides a timestamp indicating when the corresponding message was received. The plug-in module 34 of FIG. 4 allows related messages to be identified by involving the ClusterData module 38. The ClusterData module 38 groups together textually related entities within a selected region of data in the worksheet area 78, and highlights key descriptors in each group to facilitate visual determination of whether a group is homogeneous or not. When the ClusterData button 76 is selected, the ClusterData module 38 begins processing the selected data. If the first row of the selection is the heading row (i.e., row number 1), it is ignored. Each of the other rows of the selected data is considered an entity, and textually related entities are brought together by rearranging the order of rows within the selection using the clustering methods described above. Each row may include structured data for other analyses (e.g., columns A and B in this example), but the last column (which may be the only column) contains the textual information that is used for clustering. The output of the ClusterData module 38 is provided in a new worksheet and allows the user to readily perceive the key clustering concepts. As shown in FIG. 5, each row includes a cluster identification number column 80, a cluster size column 82, description columns 84 to 92 for each cluster, an initially empty filter identifier column 94, and the original input data in the last three columns 96 to 100. The maximum number of descriptions per cluster is specified by the user, and has been set to five in the example implementation shown in FIGS. 6 to 9. The last column 100 of the original input containing the textual data is modified so that key descriptors of the cluster are highlighted by colour. The rows are sorted so that rows with the same cluster identifier are together, and clusters with larger number of entries appear before those with smaller number of entries to ensure that a large number of entries can be processed quickly by the user. Initially, only one row per cluster is presented so that key concepts/topics from the textual data may be readily perceived by visual inspection. Alternate cluster rows are shaded in order to visually distinguish adjacent clusters from each other.

This initial presentation may be altered by means of presentation buttons 50 to 60. A HideDescription button 50 allows the user to hide the five columns 84 to 92 containing the cluster descriptors. The highlighting of descriptors in the textual data ensures that it is still possible to determine the descriptions when the descriptor columns 84 to 92 are hidden. A ShowDescription button 52 reverses the effect of the HideDescription button 50. An ExpandOne button 58 expands the presentation to show all the entries for one cluster. An ExpandAll button 60 performs the same function for all clusters within the selection. This enables quick visual inspection of one or all clusters so as to identify whether clusters are homogeneous or not. A CollapseOne button 54 and a CollapseAll button 56 reverse the effects of the ExpandOne button 58 and ExpandAll button 60, respectively.

Using the presentation buttons 50 to 60, clustered data may be easily inspected for major conceptual categories that emerge from the data. For instance, cluster numbers 1, 4 and 7 of FIG. 5 belong to the same conceptual grouping of people expressing greetings. Depending on the outcome required, these groups may be further merged with other groups such as 6, 9 and 21 as a single category that does not require any action from the service provider.

After text categories have been determined, a large number of entries may be annotated with a filter/category label. The process of annotation is facilitated by means of label buttons 62 to 68. A DefaultLabels button 66 labels each entry, i.e., creates a filter identifier label in the filter identifier column 94, by copying the numeric value from the cluster identifier column 80. If the number of clusters is small, and the clusters are homogeneous, this is a quick method for labelling entries. A LabelOne button 62 copies the label (from the filter identifier column 94) from the first entry (i.e., row) of a cluster down to all other entries of the same cluster. A LabelAll button 64 performs this action for all clusters within the selection. These buttons 62, 64 simplify labelling because all the user is required to do is to first check the homogeneity of clusters, then label the first entry of each cluster, and then use the LabelOne button 62 or the LabelAll button 64 to label the other entries of the clusters.

Figure 6:
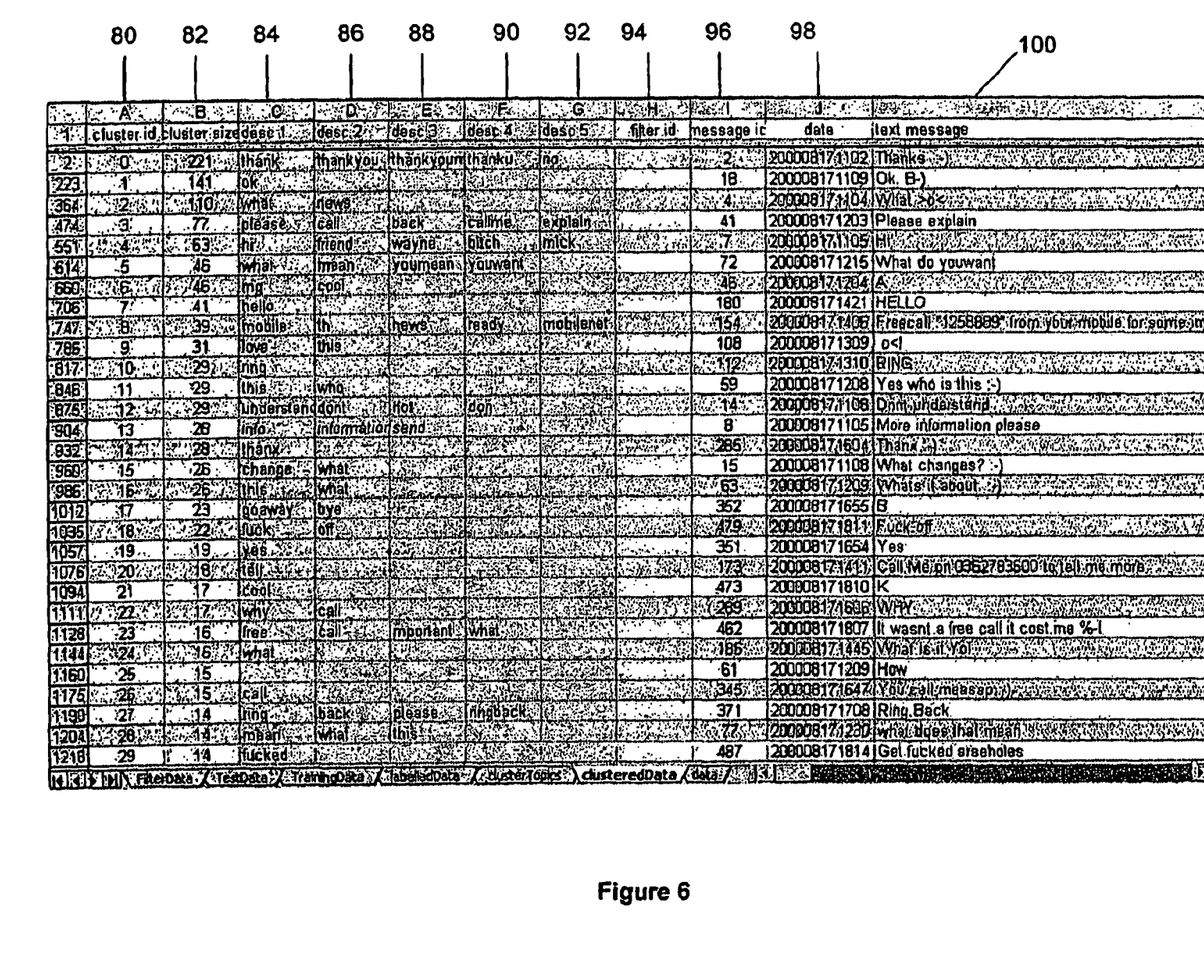

A CreateMultipleLabels button 68 may be used to allow entries to belong to multiple categories by expanding the single label provided by the filter identifier column 94 to provide one column for each of the different labels (i.e., categories) within the selected region, as shown in FIG. 6. Fields in the header row provide descriptors for the categories, and each entry within a data row provides an integer boolean value (i.e., 1 or 0) indicating whether the corresponding entry belongs to that category.

The TrainFilters module 40 uses supervised leaning to model the categories that have been defined by the ClusterData module 38 and may have been modified by the user editing the worksheet directly and/or using the labelling buttons 62 to 68. Input to the TrainFilters module 40 has a particular form, beginning with label columns 102 and ending with the textual data column 100, as shown in FIG. 6. The category label columns 102 in this example were obtained by using the CreateMultipleLabels button 68 after labeling the data using the cluster identifier, the highlighting of keywords to determine whether entries belong to a particular group, and the LabelOne button 62 and the LabelAll button 64. After this initial labelling, an entry may be placed into multiple categories, if desired (e.g., message numbers 10 and 27). The labelled data, which was first sorted in the order of cluster identifier for ease of labelling, has been resorted so that it is in ascending order of the message identifier. If desired, zero values in the category columns 102 can be hidden to improve data visualisation, as shown in FIG. 8.

The TrainFilters module 40 learns a model for each category/label after the required rows/columns in the worksheet 78 are selected. Because the category/label information and the textual data for learning come from an arbitrarily-positioned selected portion of a single worksheet 78, the TrainFilters module 40 requires the number of labels and the starting column of labels to be input by the user, and for the label columns to be contiguous. The first row is assumed to be the header row and is ignored. Models are then learnt from the textual data and the labels (which identify a filter) in the other selected rows using the training method described above.

The output from the TrainFilters module 40 is provided as a new worksheet, as shown in FIG. 7. The worksheet includes the input data columns 96 to 100, the label columns 102, and additional information in newly introduced columns (coloured blue) 104, 106. The new score columns 104 provide a score for each label/entry combination. The scores are colour-coded, with positive scores in a black typeface and negative scores in a red typeface. For the purposes of categorisation, an entry is deemed to belong to all those categories for which it has a positive score. However, for a higher confidence level, the threshold can be changed from 0 to a positive value. The error column 106 indicates whether there is an error in classification for each entry; that is, whether the classifications indicated by the category columns 102 are consistent with the values in the score columns 104. Errors in the training set are generally rare, since the model is learnt on the basis of the training set. A more thorough validation of the model may be provided by using the TestFilters module 42.

The TrainFilters module 40 produces internal models for each of the categories. These models can then be used for classification using the TestFilters module 42 or the FilterData module 44. Optionally, the scores may be automatically converted to confidence levels, which represent an estimate of the probability that an entry belongs to the corresponding category. The TestFilters module 42 uses the models created by TrainFilters 40 on a data set whose labels are known. It provides a more thorough validation of a model, because the model was created without reference to these labels and data. The input and output formats for the TestFilters module 42 are the same as those for the TrainFilters module 40. However, the error column is more likely to be populated when the models are used to categorise new data.

The FilterData module 44 uses the models created by TrainFilters 40 to classify a data set whose labels are unknown. The input format is the same as that for clustering (one entry per row, with the first row assumed to be a header row). As shown in FIG. 8, the FilterData module 44 creates score columns 104 and category columns 102. The first n columns 104 (where n is the number of labels/categories) provide the score, with positive scores in black and negative scores in red The next n columns 102 have either a 1 for all those labels that have a score greater than 0 (or the threshold value set by the user), or are empty. The 1 in a column corresponding to a label indicates that the entry belongs to that category/label. Because the scores are present, the threshold may be adjusted if a more stringent classification is required, without the need for further analysis.

Many modifications will be apparent to those skilled in the art without departing from the scope of the present invention as herein described with reference to the accompanying drawings.

The invention claimed is:

1. A data categorization computer system comprising:
    data processing logic having:
        a clusterer module configured to apply unsupervised learning to first items of electronic data stored on a computer-readable storage medium to generate a set of clusters of related ones of said first items of electronic data based on features extracted from said first items of electronic data, said features including at least one of n-grams, words and phrases, and the clusters representing respective item categories;
        an interactive cluster editor configured to display the set of clusters to a user and to modify the set of clusters based on input from the user to provide a set of training clusters;
        a filter module configured to use the set of training clusters as training data for supervised learning to generate categorization data representing models that distinguish respective ones of said clusters from the other clusters;
        a classifier configured to use the categorization data to categorize second items of electronic data stored on the computer-readable storage medium into the training clusters; and
        a trend analyzer for determining trends of item categories over time.

2. The system of claim 1, wherein the interactive cluster editor includes user interface components to create one or more clusters, delete one or more clusters, and to move one or more of said items or one or more of said clusters to another cluster.

3. The system of claim 1, wherein the system is configured to select groups of items of electronic data received over respective time periods, each selected group being provided to the clusterer module and the filter module to generate respective categorization data, the trend analyzer being adapted to compare the categorization data generated by the clusterer module with the categorization data generated by the filter module to determine changes in received items of electronic data over time.

4. The system of claim 1, wherein the clusterer module and filter module are components of a spreadsheet application.

5. The system of claim 1, wherein said clusterer module is configured to extract features from the first items of electronic data, select features from the extracted features based on discriminating abilities of the extracted features, and to generate said clusters of said first related items of electronic data based on the selected features.

6. The system of claim 1, further including a cluster describer module configured to automatically generate text describing each cluster, and wherein the interactive cluster editor is configured to modify the text describing the clusters based on input from the user.

7. The system as claimed in claim 1, wherein said features include n-grams.

8. The system as claimed in claim 1, wherein said features include n-grams, words and phrases.

9. The system of claim 1, wherein at least some of the items of electronic data are electronic documents.

10. A data categorization process executed by a computer system, the process including:
    using the computer system to apply unsupervised learning to first items of electronic data stored on a computer-readable storage medium to generate a set of clusters of related ones of said first items of electronic data based on features extracted from said first items of electronic data, said features including at least one of n-grams, words and phrases, and the clusters representing respective item categories;
    displaying the set of clusters to a user;
    receiving cluster modification data from the user;
    modifying the set of clusters on the basis of the cluster modification data to provide a set of training clusters;
    using the training clusters as training data for applying supervised learning to generate categorization data representing models that distinguish respective ones of said training clusters form the other training clusters;
    using the categorization data to categorize second items of electronic data into the training clusters; and
    determining one or more trends of respective item categories over time.

11. The process of claim 10, wherein said modifying includes one or more of: creating one or more clusters, deleting one or more clusters, moving one or more of said items to another cluster, and moving one or more of clusters to another cluster.

12. The process of claim 10, wherein the extraction of features includes:
    determining features of said first items of electronic data;
    determining discriminating abilities of said features; and
    selecting ones of said features based on said discriminating abilities, wherein the clusters are generated based on the selected features.

13. The process of claim 12, wherein a discriminating ability of each feature is determined by comparing similarities generated for groupings of said first items of electronic data with and without the feature.

14. The process of claim 10, including:
- selecting one or more of said clusters if the number of items in each of said one or more clusters exceeds a threshold value; and
- generating descriptive labels for the selected one or more clusters.

15. The process of claim 14, wherein the descriptive labels include at least one of phrases and sentences.

16. The process of claim 10, wherein at least some of said items of electronic data are electronic documents.

17. The process of claim 10, wherein at least some of said items of electronic data are entries in at least one worksheet of a spreadsheet document.

18. The process of claim 17, wherein each of said entries includes text data to be used for categorizing the entries, and structured data.

19. The process of claim 17, including generating at least one category descriptor for each entry.

20. The process of claim 17, including generating a formatted version of data of an entry to indicate a category of said entry.

21. The process of claim 17, including generating category identifiers for said entries.

22. The process of claim 17, including generating category columns of said at least one worksheet for identifying respective categories of said entries.

23. The process of claim 17, including generating one or more scores for respective categories of an entry.

24. The process of claim 23, including generating an error for an entry if any one of said one or more scores is inconsistent with a respective category.

25. The process of claim 23, wherein a score for an entry indicates that the entry belongs to a corresponding category if said score exceeds a predetermined value.

26. The process of claim 25, wherein the value of said predetermined value is zero.

27. The process of claim 25, wherein scores exceeding said predetermined value are formatted differently than scores less than said value.

28. The process of claim 23, including generating a probability that said entry belongs to a corresponding category on the basis of said score.

29. The process of claim 10, including generating a cluster identifier for identifying at least one of said clusters; and a cluster size value for identifying the size of said cluster.

30. The process of claim 10, clusters are generated on the basis of features extracted from items of electronic training data, and the process includes testing said categorization data by categorizing the electronic training data.

31. The process of claim 10, wherein the features include n-grams.

32. The process of claim 10, wherein the features include n-grams, words and phrases.

33. A computer component for use with a spreadsheet application, the component being configured to execute the steps of claim 10.

34. A data categorisation system having components configured to execute the steps of claim 10.

35. A computer readable storage medium having stored thereon program instructions for executing the steps of claim 10.

36. A data categorization system embodied on a computer-readable storage medium for use with first items of electronic data and second items of electronic data, the data categorization system including:
- a clusterer configured to apply unsupervised learning to the first items of electronic data to generate clusters of the first items of electronic data based on features extracted from the first items of electronic data, said features including at least one of n-grams, words and phrases;
- a cluster editor having user interface components for displaying the clusters of the first items of electronic data to a user of the system and for receiving cluster modification data from the user;
- the clusterer being configured to create or delete one or more clusters of the first items of electronic data and to move one or more of the first items of electronic data or one or more of said clusters to another cluster on the basis of the cluster modification data to form one or more modified clusters;
- a filter module configured to use the modified clusters as training data for supervised learning to generate classification data;
- a classifier for using the classification data to classify the second items of electronic data into the modified clusters; and
- a trend analyzer for determining trends of item classifications over time.

37. The system of claim 36 wherein the filter module is additionally configured to use the clusters of the first items of electronic data as training data for supervised learning to generate the classification data.

* * * * *